ISAAC BAKER.
Improvement in Hoof Parers.
No. 119,734.  Patented Oct. 10, 1871.
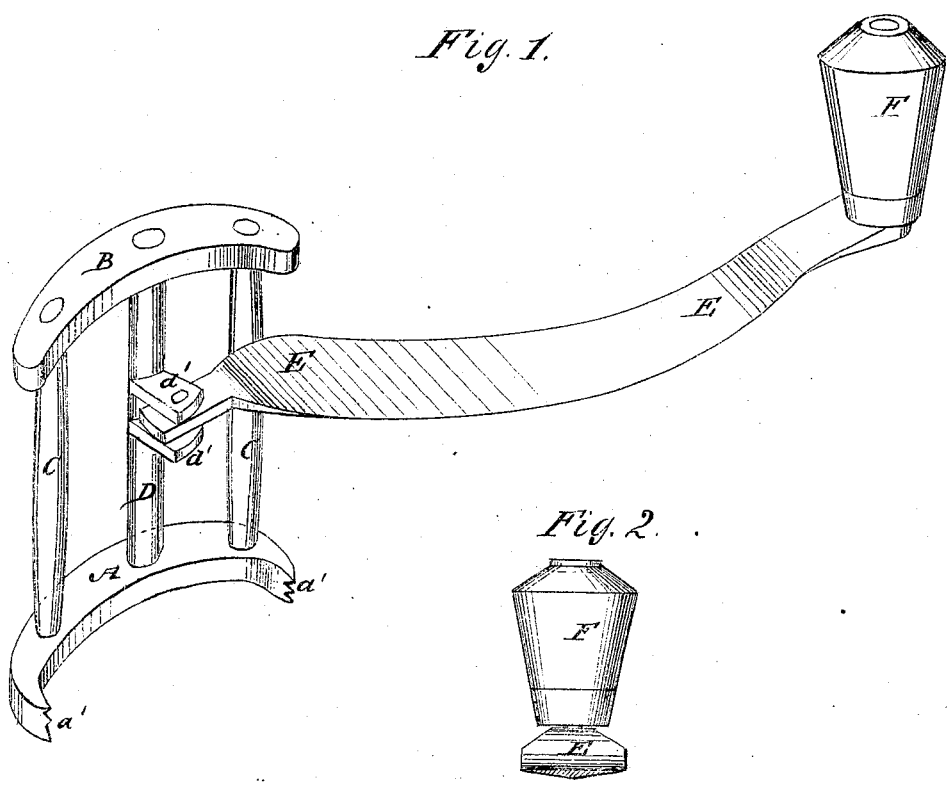

119,734

UNITED STATES PATENT OFFICE.

ISAAC BAKER, OF LONG BRANCH, MISSOURI.

IMPROVEMENT IN HOOF-PARERS.

Specification forming part of Letters Patent No. 119,734, dated October 10, 1871.

*To all whom it may concern:*

Be it known that I, ISAAC BAKER, of Long Branch, in the county of Monroe and State of Missouri, have invented a new and useful Improvement in Hoof-Parers; and I do hereby declare that the following is a full, clear, and exact description thereof, which will enable others skilled in the art to make and use the same, reference being had to the accompanying drawing forming part of this specification.

Figure 1 is a perspective view of my improved hoof-parer. Fig. 2 is a detail cross-section of the blade.

My invention has for its object to furnish an improved instrument for paring horses' hoofs preparatory to setting shoes, which shall be simple in construction, convenient in use, and effective in operation, enabling the hoof to be pared quickly and accurately; and it consists in the parer constructed as hereinafter more fully described.

A B are two curved bars, the lower one A of which has claws $a'$ formed upon its ends to enable it to be held firmly to the hoof. The bars A B are connected near their ends by two bars or rods, C, as shown in Fig. 1, and at their center by a rod or bar, D, to which are attached two lugs, $d'$, to and between which is loosely pivoted the end of the blade E so that the said blade may have the necessary play. The blade E is made with a cutting edge upon each side edge, as shown in Fig. 2, so that it may cut right and left to pare both sides of the hoof. The middle part of the blade E is curved downward, as shown in Fig. 1, to enable the cuts to be made conveniently. To the outer end of the blade E is pivoted an upwardly-projecting handle, F, for convenience in operating it.

In using the instrument it is applied to the hoof with the clawed bar A $a'$ downward, and the instrument and hoof are both held with the left hand while the blade E is operated with the right hand. By placing the instrument upon the front side of the hoof the frog may be conveniently pared or trimmed. The knife E is so arranged that the forward part or toe of the hoof may be pared easier than the rear part or heel, thus enabling the hoof to be pared level and as it should be for properly shoeing a horse. The main art in horse-shoeing is to let the heel stand, pare down the toe, and leave the bottom of the hoof level.

Having thus described my invention, I claim as new and desire to secure by Letters Patent—

An improved hoof-parer, formed by the combination of the curved bars A $a'$ and B, connecting end-bars or rods C, center-bar or rod D $d'$, and double-edged curved blade E F with each other, substantially as herein shown and described, and for the purpose set forth.

ISAAC BAKER.

Witnesses:
 J. T. NEWNAN,
 B. F. MILLER.

(45)